(12) United States Patent
Wagner

(10) Patent No.: US 6,346,221 B1
(45) Date of Patent: *Feb. 12, 2002

(54) APPARATUS FOR RECOVERING MATERIALS FROM WASTE TIRES

(75) Inventor: Anthony S. Wagner, Bee Caves, TX (US)

(73) Assignee: Clean Technologies International Corporation, Lakeway, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,636

(22) Filed: Sep. 17, 1998

(51) Int. Cl.$^7$ .................................................. B09B 3/00
(52) U.S. Cl. ..................... 422/184.1; 422/171; 422/232; 202/218; 588/201
(58) Field of Search ........................ 202/219; 422/184.1, 422/233, 232, 171; 201/11; 588/201

(56) References Cited

U.S. PATENT DOCUMENTS

| | | | |
|---|---|---|---|
| 2,858,255 A | * 10/1958 | Segui et al. ................. | 202/219 |
| 4,552,667 A | 11/1985 | Shultz | |
| 4,614,752 A | * 9/1986 | Fuchs et al. ................. | 521/44.5 |
| 4,666,696 A | 5/1987 | Shultz | |
| 4,925,532 A | * 5/1990 | Meuser et al. ............... | 202/219 |
| 5,000,101 A | 3/1991 | Wagner | |
| 5,236,352 A | * 8/1993 | Carpenter .................... | 432/13 |
| 5,271,341 A | 12/1993 | Wagner | |
| 5,449,438 A | * 9/1995 | Jagau et al. .................. | 201/10 |
| 5,452,671 A | 9/1995 | Wagner | |
| 5,628,261 A | * 5/1997 | Beckstead et al. .......... | 110/346 |
| 5,852,062 A | * 12/1998 | Carpenter .................... | 521/41 |

* cited by examiner

Primary Examiner—Hien Tran
(74) Attorney, Agent, or Firm—Russell D. Culbertson; Shaffer & Culbertson, LLP

(57) ABSTRACT

A waste tire processing apparatus (10) reacts waste tires (26) with a molten reactant metal (19) to recover primarily carbon and stainless steel. The apparatus (10) includes a tire positioning arrangement (20) for positioning the waste tires (26) in the molten reactant metal (19) for a reaction period. After the reaction period, the tire positioning arrangement (20) removes from the molten metal non-reacted solids remaining after the reaction. The non-reacted solids comprise primarily stainless-steel included in the waste tires. As the waste tires (26) are reacted in the molten reactant metal (19), a gas recovery arrangement (14) collects process gases released from the molten metal. The gas recovery arrangement (14) recovers primarily carbon, metal salts, hydrogen, and nitrogen.

11 Claims, 5 Drawing Sheets

APPARATUS FOR RECOVERING MATERIALS FROM WASTE TIRES

TECHNICAL FIELD OF THE INVENTION

This invention relates to recycling materials made up of organic compounds and metals such as stainless-steel. More particularly, this invention is directed to an apparatus and method for processing waste tires to recover primarily carbon and stainless-steel.

BACKGROUND OF THE INVENTION

Used vehicle tires pose a significant environmental threat. Even with sufficient landfill space, whole tires are too flexible to be placed in landfills. Storing waste tires above surface is unacceptable because whole tires not only take up a great deal of space, but also create habitat for insect pests and rodents. Waste tires may be incinerated but the combustion process releases massive amounts of pollutants into the atmosphere unless expensive scrubbing systems are used to clean incinerator exhaust gases. Incineration also leaves ash which must be disposed of in some manner. Also, waste tires must be shredded or otherwise comminuted into small pieces in order to burn efficiently in an incinerator.

SUMMARY OF THE INVENTION

It is a broad object of the invention to provide an apparatus and method which overcome the above-described the problems and others associated with the disposal of waste tires. Another object of the invention is to provide a waste tire treatment apparatus and process which recovers useful materials from the tires.

The method of recovering material from waste tires according to the invention includes reacting substantially whole waste tires with a molten reactant metal. The waste tires react with the molten metal to produce primarily carbon gas and metal salts in molten or gaseous form. After a reaction period during which time the waste tires are in contact with the reactant metal, the method includes removing non-reacted solids from the reactant metal. These non-reacted solids comprise mainly stainless-steel which was included in the tires. Removing any stainless-steel remaining after the reaction period prevents the stainless-steel from dissolving into the reactant metal and corrupting the reactant metal bath.

Importantly, the tire treatment method according to the invention does not require shredding or otherwise comminuting tires into small pieces, and therefore eliminates the expense associated with this processing step. Also, the present waste tire treatment method releases only hydrogen gas and perhaps nitrogen gas to the atmosphere. Substantially all carbon from compounds which make up the tires is recovered as pure elemental carbon. Other elements included in compounds which make up the tires are recovered as metal salts. Stainless steel recovered in the process may be reused.

The apparatus for performing the tire treatment method according to the invention includes a reactor vessel which may be charged with a suitable reactant metal, preferably including mostly aluminum. A heater associated with the reactor vessel heats the reactant metal to a molten state and a circulating system preferably associated with the reactor vessel and heater circulates fresh reactant metal into the reactor vessel. The apparatus also includes a tire positioning arrangement and a gas recovery arrangement.

At least one and preferably several tire carriers are included in the tire positioning arrangement. Each tire carrier comprises a structure on which waste tires may be loaded and then lowered into the molten reactant metal in the reactor vessel. Each tire carrier preferably includes an open support structure which allows the molten reactant metal to flow through the structure and around the waste tires as the carrier structure and tires are lowered into the reactant metal.

A carrier lift structure is associated with each tire carrier for moving each tire carrier between a loading/collecting position away from the reactor vessel and a reaction position within the reactor vessel. The tire lift structure includes an arrangement for moving each tire carrier vertically so that each carrier may be lowered into the reactor vessel and lifted from the reactor vessel. The tire lift structure is also capable of moving each tire carrier laterally away from the reactor vessel to the loading/collecting position. A cooling system may be associated with the tire lift structure for cooling each carrier and any non-reacted solids remaining after removal from the molten reactant metal.

The tire positioning arrangement also includes a tire submerging system including a tire contactor member and a contactor actuator. As the waste tires are lowered into the reactant metal on a tire carrier, the tires may tend to float on the surface of the molten reactant metal rather than sink below the surface. The tire contactor member is in position to move downwardly over the waste tires, pushing the tires into the molten reactant metal and holding the tires beneath the surface of the reactant metal for the reaction period.

The gas recovery arrangement includes a gas recovery hood which is placed in an operating position over the waste tires and tire carrier before the tires are submerged into the molten reactant metal. In the operating position, the lower edge of the hood extends below the surface of the molten reactant metal to form a seal with the surface of the reactant metal around the area in which the tires are to be submerged. Once the gas recovery hood is in the operating position, and preferably purged of air with a suitable inert gas, the tire carrier and loaded waste tires are lowered into the reactant metal.

The gas recovery hood collects process gases released from the surface of the molten reactant metal. The process gases include primarily gaseous carbon and gaseous metal salts along with hydrogen and perhaps nitrogen. The collected process gases are passed through an aqueous scrubber to cool and remove the carbon and metal salts. A suitable liquid/solid separator separates the solidified carbon from the scrubber effluent and the remaining solution is then treated by a suitable process to remove the metal salts.

The waste tire treatment apparatus and method of the invention quickly recovers carbon and stainless steel from substantially whole used tire carcasses. Both the carbon and stainless steel may be reused in various products. Also, the apparatus and method produce substantially no harmful gaseous emissions.

These and other objects, advantages, and features of the invention will be apparent from the following description of the preferred embodiments, considered along with the accompanying drawings.

DESCRIPTION OF THE PREFERRED EMBODIMENTS

Figure 1:
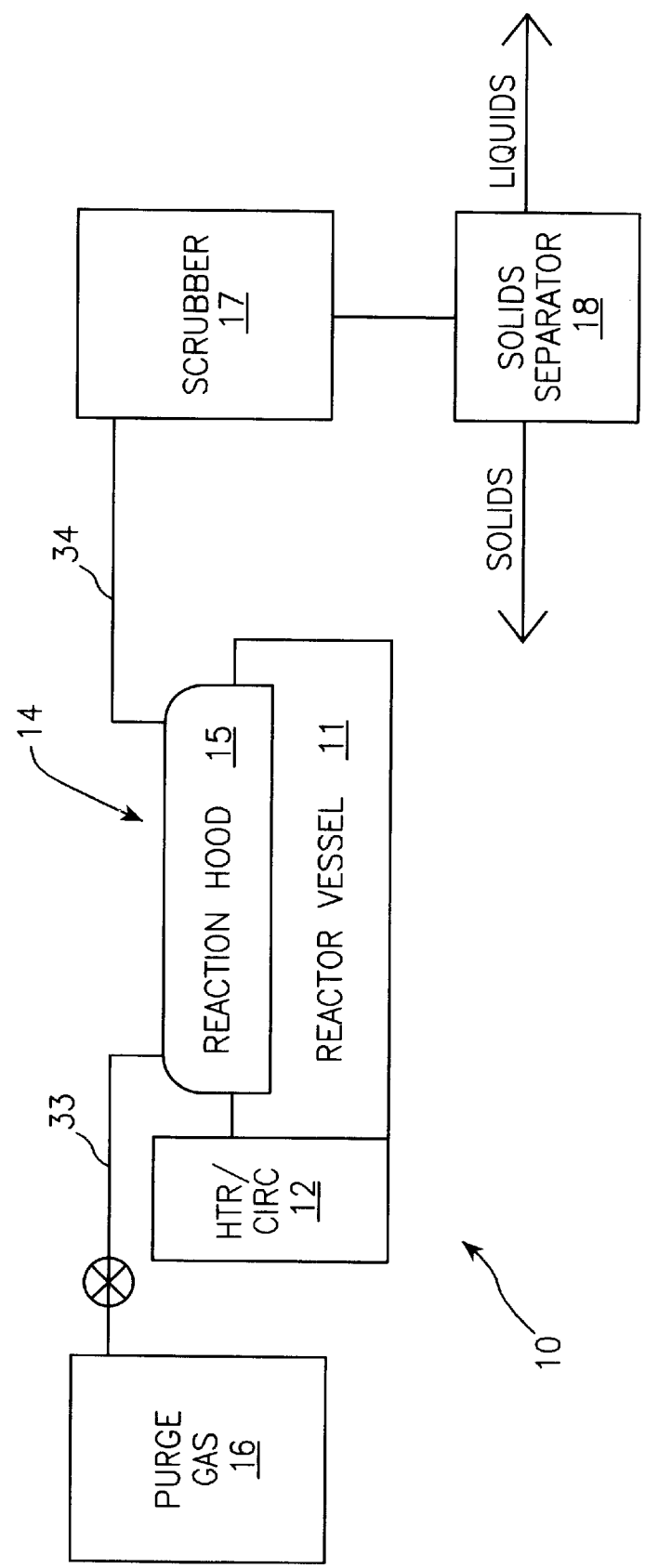
FIG. 1 is a diagrammatic representation of a waste tire processing system embodying the principles of invention.

FIG. 1 illustrates major portions of a tire processing apparatus 10 embodying the principles of the invention. Apparatus 10 includes a reactor vessel 11 and a heater/circulating arrangement 12. Apparatus 10 also includes a gas recovery arrangement shown generally at reference numeral 14. Gas recovery arrangement 14 includes gas recovery hood 15, purge gas supply 16, aqueous scrubber 17, and solids separator 18.

Figure 2:
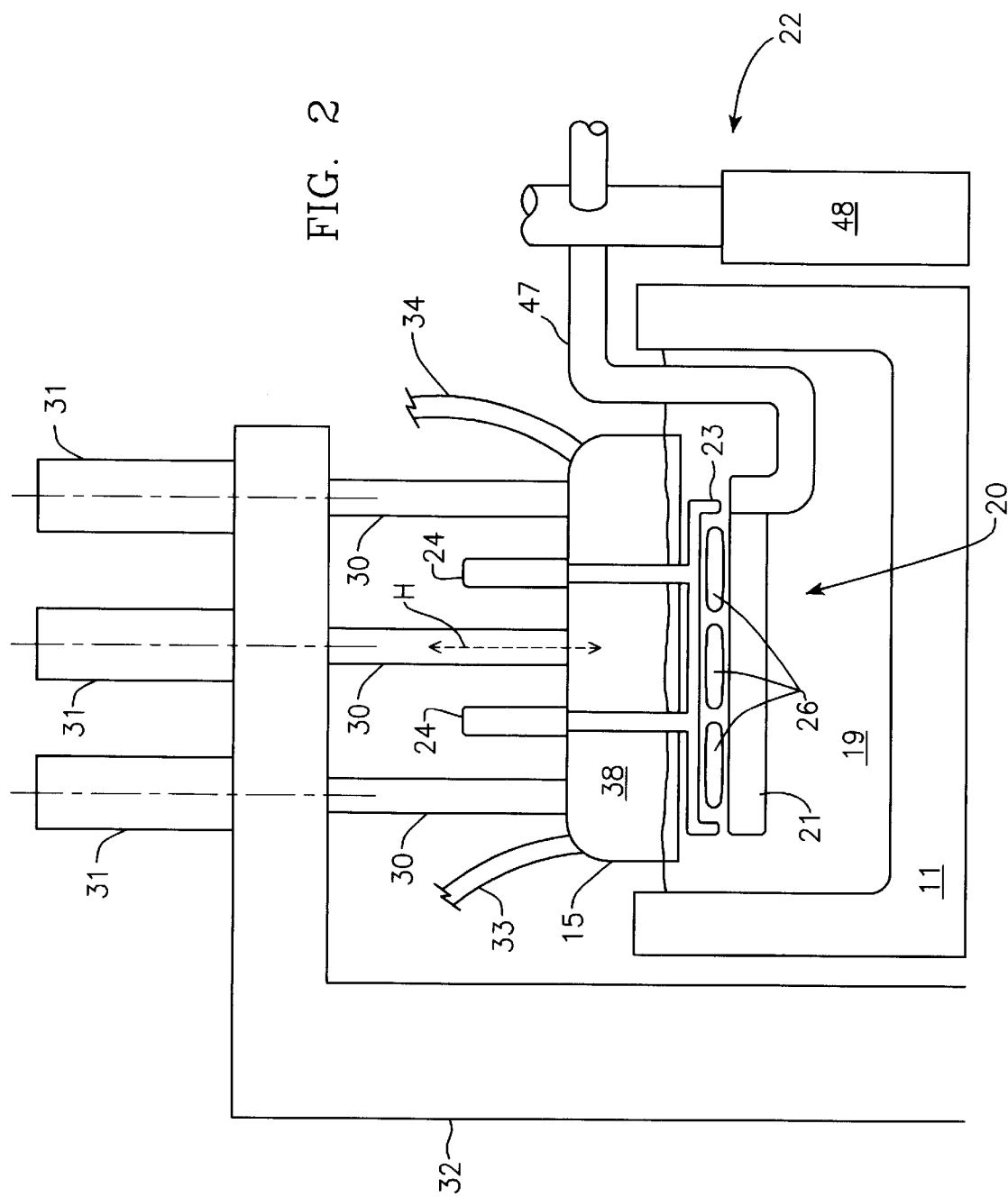
FIG. 2 is a somewhat diagrammatic side view of an apparatus embodying the principles of the invention for processing waste tires.

Referring to FIG. 2, reactor vessel 11 is charged with a suitable reactant metal 19. The reactant metal preferably includes primarily aluminum and may include minor amounts of iron, copper, zinc, and calcium. A suitable reactant alloy is disclosed in U.S. Pat. No. 5,000,101, which is incorporated herein by this reference. Although not shown in the drawings, a layer of graphite may be positioned on the surface of the reactant metal 19 to help the molten metal retain heat and reduce oxide formation at the surface of the metal.

The heater 12 shown in FIG. 1 comprises a suitable heating system for heating the reactant metal to a molten state which may preferably be from approximately 850° to 950° Celsius. The circulating system associated with heater 12 circulates fresh reactant metal into reactor vessel 11 and helps maintain the reactant metal in the vessel at the desired temperature. The heater may be gas fired or, alternatively, comprise an electrical induction heating system. Details of the heater and circulating system 12 are omitted from this disclosure so as not to obscure the invention in unnecessary detail. In any event, the heater and reactant metal circulating system 12 is within the knowledge of those skilled in this art.

Referring still to FIG. 2, apparatus 10 also includes a tire positioning arrangement shown generally at reference numeral 20. The tire positioning arrangement 20 includes a tire carrier 21 and carrier lift structure 22, as well as a tire contactor member 23 and at least one contactor actuator 24. Although the illustrated form of the invention includes two contactor actuators, other arrangements may include one or more contactor actuators.

Tire carrier 21 and carrier lift structure 22 are described in more detail with reference to FIGS. 4 and 5 below. However, as shown in FIG. 2, tire carrier 21 includes a structure on which whole tires 26 to be processed may be loaded. Carrier lift structure 22 moves the tire carrier 21 from a loading/collecting position described below, particularly with reference to FIG. 5, to a reaction position shown in FIG. 2. In the reaction position, the tire carrier 21 is below the surface of the reactant metal far enough to allow tires 26 loaded on the carrier to be fully submerged in the reactant metal 19.

Tire contactor member 23 and contactor actuators 24 help ensure that the tires 26 to be processed are fully submerged in the reactant metal 19. As a tire carrier 21 loaded with tires 26 descends into the reactant metal 19, tires may tend to float on the surface of the reactant metal. Contactor member 23 above the tire carrier 21 moves downwardly on its actuators 24 to press the tires 26 into the molten reactant metal 19. The illustrated contactor member 23 and contactor actuators 24 are conveniently associated with the gas recovery hood 15. However, the contactor member 23 and contactor actuators 24 need not be associated with the hood 15. Also, the contactor actuators 24 may comprise any suitable actuators, including hydraulic actuators or mechanical actuators, for example.

As shown in FIG. 2, gas recovery hood 15 is suspended on hood supports 30 which are connected to hood actuators 31. Hood actuators 31 operate to move hood 1 up and down along axis H. Gas recovery hood 15 is shown in an operating position in FIG. 2 and may be raised by actuators 31 to a retracted position well above the reactor vessel 11. The hood actuators 31, hood supports 30, and gas recovery hood 15 are all supported on a superstructure 32. As with the contactor actuators 24, hood actuators 31 may comprise any suitable actuators such as hydraulic or mechanical actuators, for example. Although three separate hood actuators 31 are shown for purposes of example in FIG. 2, one or more hood actuators may be used within the scope of the invention. A moveable purge gas conduit 33 is connected to the hood 15 at one end and a moveable outlet conduit 34 is connected at the opposite end of the gas recovery hood. Purge gas conduit 33 extends to the purge gas supply shown in FIG. 1, while outlet conduit 34 extends to the aqueous scrubber 17 also shown in FIG. 1. Both the conduits 33 and 34 must be capable of moving to accommodate the movement of the gas recovery hood 15 between its operating position and retracted position.

Reactor vessel 11, tire carrier 21, tire contactor member 23, portions of the gas recovery hood 15, and all other elements which come into contact with the molten reactant metal 19 may comprise any suitable metal which retains sufficient strength at the high operating temperatures of the reactant metal. All of these elements are preferably coated with a ceramic or refractory material which protects the underlying structural metal from degradation by contact with the reactant metal 19 in the reactor vessel 11.

The operation of the tire processing apparatus 10 may be described with reference to FIGS. 3A, 3B, and 3C. FIG. 3A shows the gas recovery hood 15 in its retracted position and a tire carrier 21 loaded with tires 26 to be processed in a ready position in which it resides just above the surface of the molten reactant metal 19. As shown in FIG. 3B, the tire treating method includes lowering gas recovery hood 15 to an operating position. In the operating position, the lower edge of the gas recovery hood 15 extends into the reactant metal 19 around the entire periphery of tire carrier 21, that is, around the area in which tires 26 are to be submerged. At this point, the gas recovery hood 15 defines a gas collection area 38 over the area in which tires are to be submerged. Once hood 15 is in the operating position, the preferred tire treatment method includes purging the gas collection area 38 of air with a suitable purge gas such as nitrogen, for example, supplied from purge gas supply 16 shown in FIG. 1. Purging the gas collection area 38 of air helps prevent the production of $CO_2$ which would have to be released into the atmosphere. Although it is possible to operate the apparatus 10 without purging the gas collection area 38, it is desirable to reduce $CO_2$ emissions and thus, purging the gas collection area is preferred.

Figure 3C:
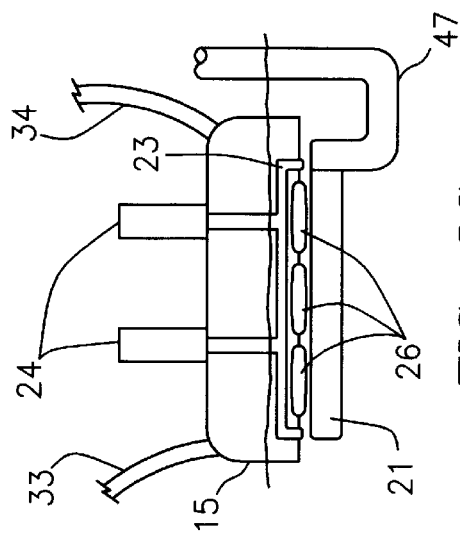
FIG. 3C is a diagrammatic representation similar to FIG. 3B but with the tire carrier in the reaction position submerged below the surface of the molten reactant metal.
Figure 3B:
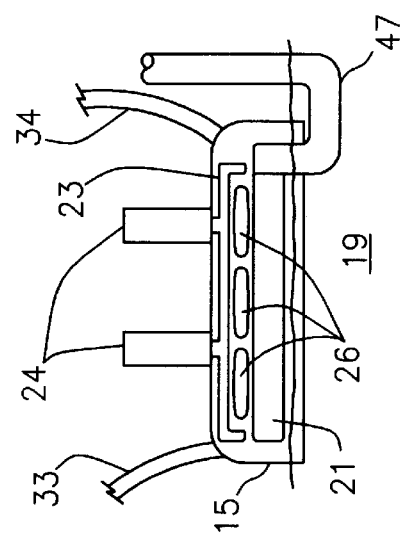
FIG. 3B is a diagrammatic representation similar to FIG. 3A but with the hood in the operating position.
Figure 3A:
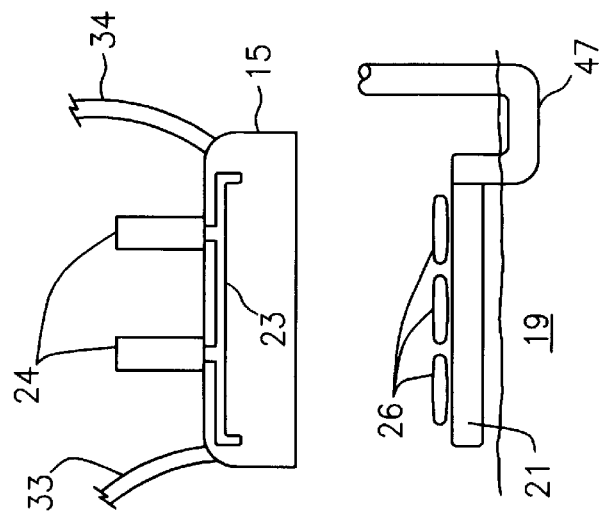
FIG. 3A is a mostly diagrammatic representation of a tire carrier and gas recovery hood in a ready position.

As shown in FIG. 3C, after gas recovery hood 15 is placed in the operating position and any purge operation is complete, the tire carrier 21 and tires 26 to be processed are lowered into the reactant metal 19. The tire contactor member 23 also moves downwardly to a second position in which it presses the tires 26 below the surface of the reactant metal.

The tire treatment method includes holding the tires 26 in the reaction position contacting the reactant metal 19 for a reaction period which will depend upon the number of tires being processed. The reaction period is a period of time sufficient to react substantially all material included in the tires except for any stainless steel which may be included in the tire carcass. The stainless steel in the tires does not react chemically with the reactant metal 19, but will dissolve into the reactant metal over time. Thus, once the organic compounds in the tires are reacted with the molten reactant metal 19, the carrier lift structure 20 shown in FIG. 2 lifts the tire carrier 21 and unreacted solids out of the reactant metal, once again to the position shown in FIG. 3B. At this point, the gas collection area 38 under gas recovery hood 15 is preferably again purged with a suitable inert gas to move all process pgageg out through outlet conduit 34 to scrubber 17. After purging the gas collection area 38, the hood 15 is raised to the fully retracted position and the tire carrier 21, now carrying the unreacted solids comprising primarily stainless steel, is raised completely out of the reactor vessel 11 so that the carrier may be moved to its loading/collection position discussed below with reference to FIG. 5.

Tires are comprised of approximately 56% various organic compounds, including rubber and natural and synthetic binders, 30% carbon black, 10% stainless steel, and 4% inert materials by weight. The preferred molten aluminum or aluminum alloy reactant metal strips elements from the carbon atoms in the organic compounds to form various aluminum and perhaps other metal salts. The liberated carbon sublimes to a gaseous state at the operating temperature of the molten reactant metal and some of the metal salts may also go into a gaseous phase. Other metal salts produced by the reaction may separate by gravity to the top of the reactant metal alloy below any graphite layer.

All of the process gases, including gaseous carbon, metal salts, hydrogen, and perhaps nitrogen release from the reactant metal and collect in the gas collection area 38 under gas recovery hood 15. The collected process gases then flow through outlet conduit 34 to the material recovery system which preferably includes the aqueous scrubber 17 and solids separator 18 shown in FIG. 1. Water in the aqueous scrubber 17 cool the carbon in the process gases to form fine carbon particles in the scrubber effluent. Metal salts in the process gases are also cooled in the scrubber 17 and go into solution in the scrubber effluent. The scrubber effluent is directed to solids separator 18 which separates the carbon from the aqueous metal salt solution. The resulting carbon may be formed into bricks which have a high fuel value. The metal salts may be removed from the solution by any suitable process and the separated water is preferably recycled back to the aqueous scrubber 17.

Figure 4:
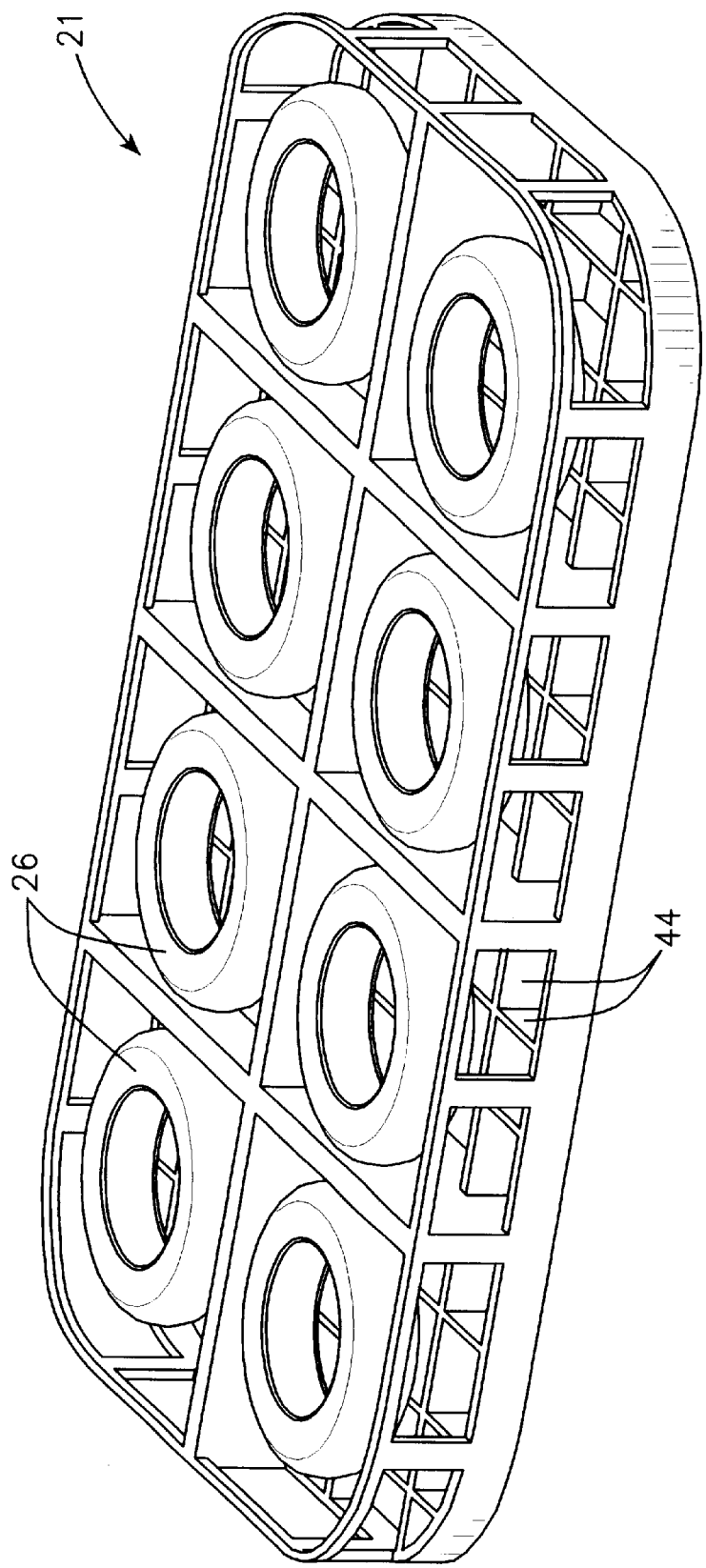
FIG. 4 is an isometric drawing of a preferred tire carrier structure.

FIG. 4 shows a preferred tire carrier 21 loaded with wasted tires 26 to be processed. Tire carrier 21 includes an open structure 44 which allows reactant metal to flow easily around the tires 26 as the carrier is lowered into the molten reactant metal 19 shown in FIG. 2. The open structure 44 also allows excess reactant metal to drain from the tire carrier 21 as it is lifted out of the reactant metal after the reaction period. However, the open structure 44 of tire carrier 21 provides sufficient support to hold unreacted solids, primarily stainless steel, and prevent the stainless steel from slipping into the reactant metal 19 as the carrier is lifted out of the reactor vessel 11.

Figure 5:
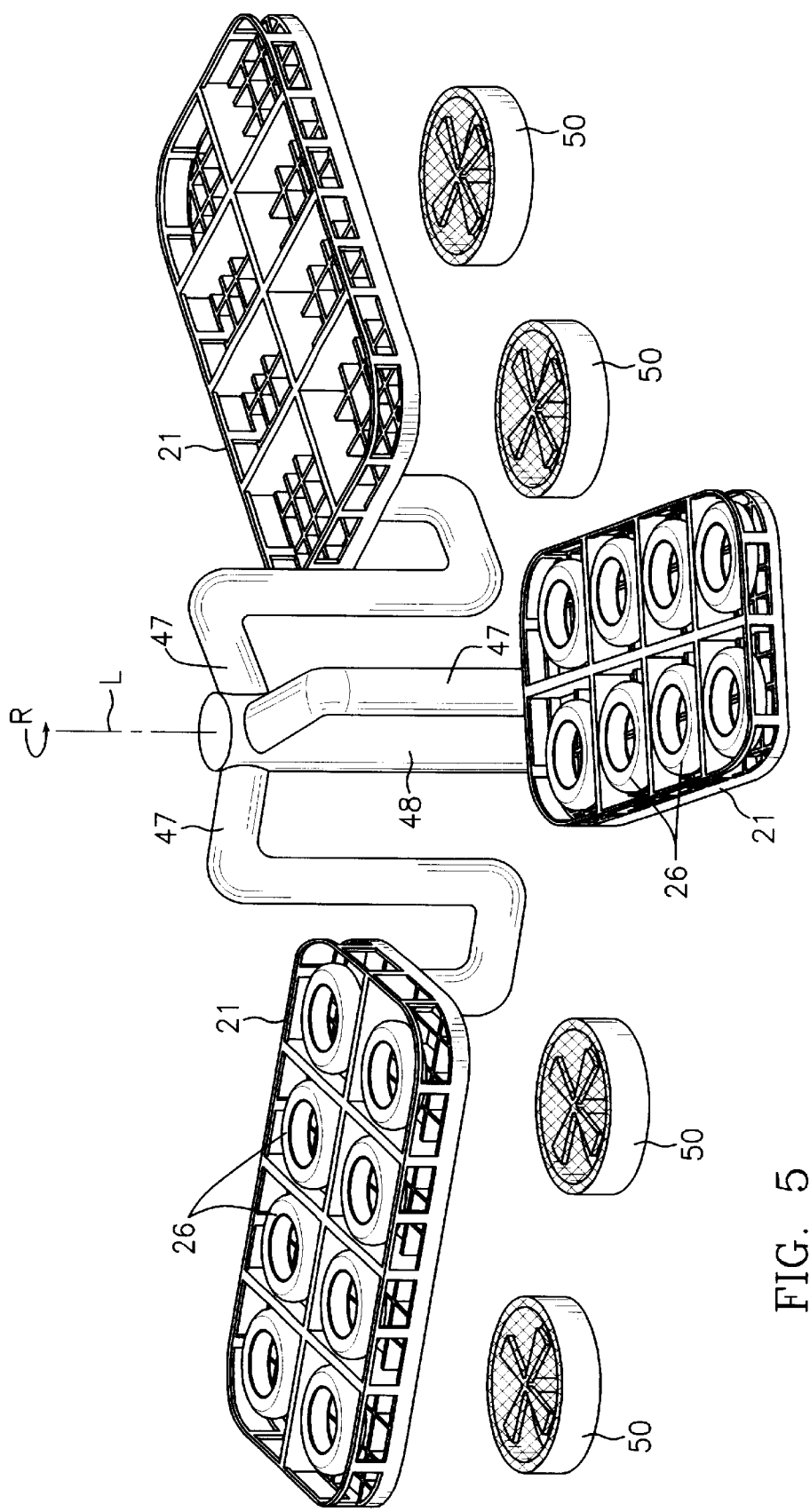
FIG. 5 is a somewhat diagrammatic isometric drawing of a preferred tire carrier, carrier lift structure, and cooling arrangement embodying the principles of the invention.

FIG. 5 shows a plurality of tire carriers 21 and a preferred carrier lift structure 22. Each tire carrier 21 is connected to the lift structure 22 through a goose neck or U-shaped support 47 which is required in order to allow gas recovery hood 15 to form the desired seal around an individual tire carrier as shown in FIGS. 3B and 3C. A central lift mechanism 48 of the carrier lift structure 22 is capable of rotating in the direction R and also, is capable of moving along axis L. Thus, for example, the tire carrier 21 shown in the foreground in FIG. 5 may be in the reaction position within the reactor vessel 11 (not shown in FIG. 5), while the other tire carriers 21 are each removed from the reactor vessel in a loading or collecting position. The tire carrier 21 on the right in FIG. 5 may be in a collecting position in which stainless steel left after reacting tires with the reactant metal may be removed from the tire carrier. The tire carrier 21 on the left in FIG. 5 may be in a loading position in which waste tires 26 are loaded for processing. In any event, cooling fans 50 or another suitable cooling arrangement may be associated with the apparatus 10 for cooling the tire carriers 21 in the loading or collecting positions. After one of the tire carriers 21 is removed from the molten reactant metal 19 shown in FIG. 1, the cooling fans 50 cool the respective tire carrier down to a temperature at which unreacted solids may be conveniently removed from the carrier and additional tires may be loaded.

The above described preferred embodiments are intended to illustrate the principles of the invention, but not to limit the scope of the invention. Various other embodiments and modifications to these preferred embodiments may be made by those skilled in the art without departing from the scope of the following claims. For example, although the illustrated form of the invention shows linear actuators for moving the gas recovery hood 15 and tire contactor member 23 along vertical axes, alternate actuator arrangements may pivot the hood and tire contactor member into and out of position. Also, although the invention is suited to processing substantially whole tires, and therefore eliminate a tire shredding step, whole tires may be cut up into smaller pieces prior to processing according to the invention. However, the tire carrier must accommodate the smaller tire pieces without allowing pieces of stainless steel to fall into the molten reactant metal as the carrier is removed from the reactor vessel.

What is claimed is:

1. An apparatus for recovering materials from waste tires, the apparatus including:

(a) a reactor vessel for containing a molten reactant metal;

(b) a heater for heating the reactant metal to a molten state and maintaining the reactant metal in the molten state;

(c) a tire carrier for carrying at least one waste tire;

(d) a carrier lift structure for positioning the tire carrier alternatively in a loading position removed from the molten reactant metal and a reaction position in which the carrier is submerged within the molten reactant metal;

(e) a tire contactor member adapted to reside in a first position above the surface of the reactant metal and a second position below the surface of the reactant metal, the contactor member in the second position extending across an area directly above the tire carrier in the reaction position so as to press each waste tire carried on the tire carrier into the molten reactant metal;

(f) a contactor actuator for moving the tire contactor member between the first position and the second position; and (g) a gas recovery arrangement for collecting process gases released as each waste tire reacts with the molten reactant metal.

2. The apparatus of claim 1 wherein the reactant metal includes predominantly aluminum.

3. The apparatus of claim 1 wherein the tire contactor member and tire carrier each include an outer surface comprising a ceramic material which will not react with the molten reactant metal.

4. The apparatus of claim 1 wherein the gas recovery arrangement includes:
   (a) a gas recovery hood adapted to contain process gasses released from the molten reactant metal as each waste tire reacts in the molten reactant metal; and
   (b) a hood positioning arrangement for positioning the gas recovery hood alternately in an operating position and a standby position, the gas recovery hood in the operating position having a lower edge thereof submerged within the molten reactant metal to define an area encompassing the tire carrier in the reaction position, and the gas recovery hood in the standby position in a location removed from contact with the molten reactant metal.

5. The apparatus of claim 4 further comprising:
   (a) a gas purging system associated with the gas recovery hood for purging the gas recovery hood when the gas recovery hood is in the operating position.

6. The apparatus of claim 1 further comprising:
   (a) an aqueous scrubber for removing carbon and metal salts from the process gases.

7. An apparatus for recovering materials from waste tires, the apparatus including:
   (a) a reactor vessel containing a molten reactant metal at a reaction temperature no less than approximately 850 degrees Celsius, the reactant metal including predominantly aluminum;
   (b) a heater for heating the reactant metal to the reaction temperature and maintaining the reactant metal at the reaction temperature;
   (c) a tire carrier for carrying at least one waste tire;
   (d) a carrier lift structure for positioning the tire carrier alternatively in a loading position removed from the molten reactant metal and a reaction position in which the tire carrier is submerged within the molten reactant metal;
   (e) a tire contactor member adapted to reside in a first position above the surface of the reactant metal and a second position below the surface of the reactant metal, the contactor member in the second position extending across an area directly above the tire carrier in the reaction position so as to press each waste tire carried on the tire carrier into the molten reactant metal;
   (f) a contactor actuator for moving the tire contactor member between the first position and the second position; and
   (g) a gas recovery arrangement for collecting process gases released as each waste tire reacts with the reactant metal.

8. The apparatus of claim 7 wherein the tire contactor member and tire carrier each include an outer surface comprising a ceramic material which will not react with the molten reactant metal.

9. The apparatus of claim 7 wherein the gas recovery arrangement includes:
   (a) a gas recovery hood adapted to contain process gasses released from the molten reactant metal as each waste tire is reacted in the molten reactant metal; and
   (b) a hood positioning arrangement for positioning the gas recovery hood alternately in an operating position and a standby position, the gas recovery hood in the operating position having a lower edge thereof submerged within the molten reactant metal to define an area encompassing the tire carrier in the reaction position, and the gas recovery hood in the standby position in a location removed from contact with the molten reactant metal.

10. The apparatus of claim 9 further comprising:
   (a) an aqueous scrubber for removing carbon and metal salts from the process gases.

11. The apparatus of claim 9 further comprising:
   (a) a gas purging system associated with the gas recovery hood for purging the gas recovery hood when the gas recovery hood is in the operating position.

* * * * *